June 7, 1927.
W. HEMINGWAY, JR
1,631,267
AUTOMOBILE LOCKING MEANS
Filed July 7, 1926
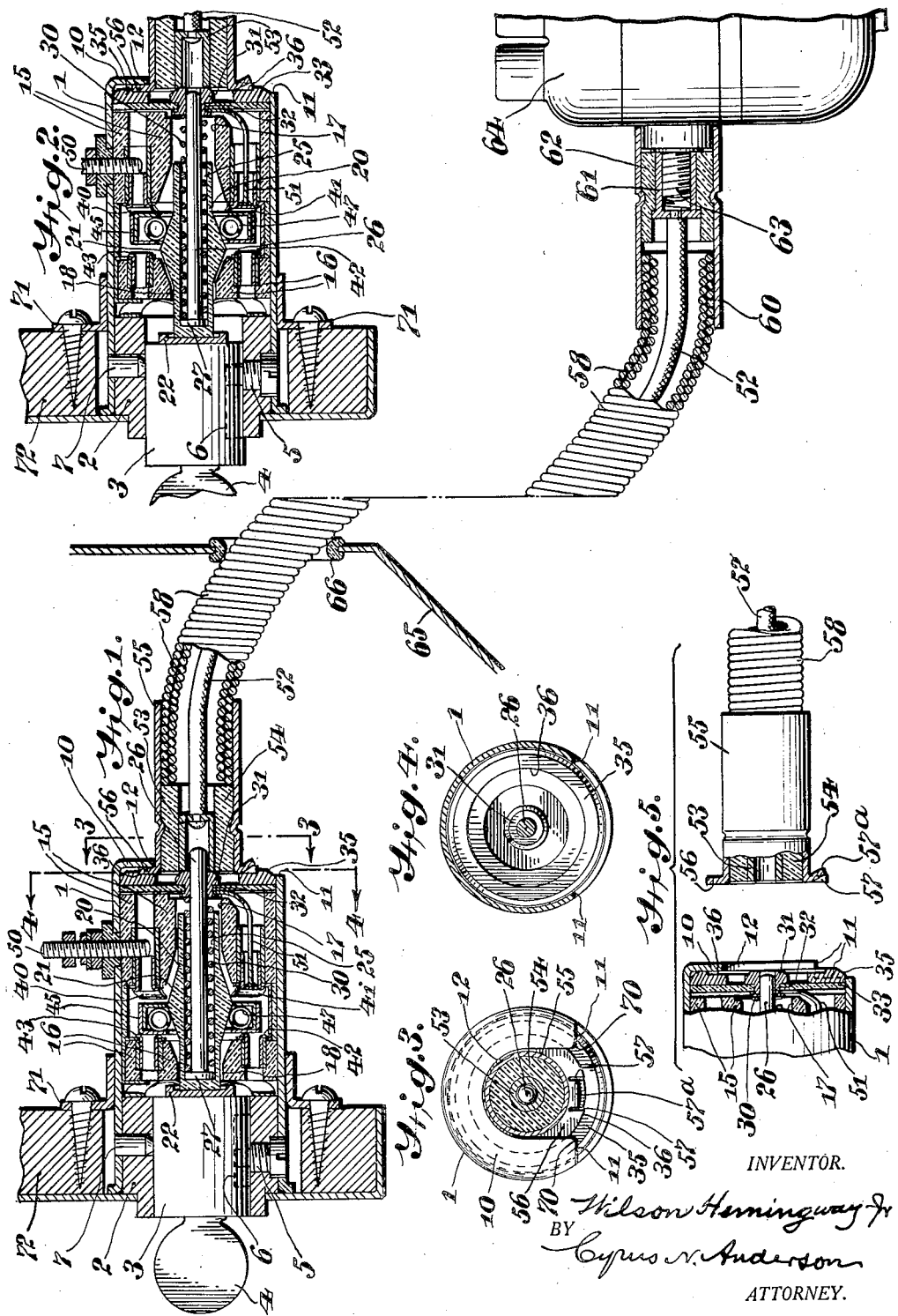
INVENTOR.
Wilson Hemingway Jr
BY
Cyrus N. Anderson
ATTORNEY.

Patented June 7, 1927.

1,631,267

UNITED STATES PATENT OFFICE.

WILSON HEMINGWAY, JR., OF MELROSE, PENNSYLVANIA, ASSIGNOR TO THE ELECTROLOCK MANUFACTURING COMPANY, OF VICKSBURG, MISSISSIPPI, A CORPORATION OF MISSISSIPPI.

AUTOMOBILE LOCKING MEANS.

Application filed July 7, 1926. Serial No. 120,965.

My invention relates broadly to locking means for automobiles and other like structures which include ignition mechanisms or systems. Locking means of the character to which this invention relates are illustrated and described in applications for Letters Patent of the United States which were filed by me April 28, 1924, Serial No. 709,695 (Series of 1915), and Serial No. 709,696 (Series of 1915), and July 7, 1925, Serial No. 42,058 (Series of 1925), and September 10, 1925, Serial No. 55,518 (Series of 1925).

It sometimes becomes necessary for one reason or another to disassemble the locking means of an automobile or other structure and in consequence it is desirable that special means be provided whereby such disassembling may be facilitated and rendered easy of accomplishment. In the structures embodying my inventions as disclosed in the applications aforesaid no such means has been provided and therefore, if it should become necessary to disassemble the structures thereof difficulty would be encountered.

In the present invention I have provided a locking structure including means whereby the cable located intermediate the said structure and the ignition mechanism or system may be readily disconnected from said locking structure thereby facilitating the repair of the portions of the mechanism involved.

The general object of the invention, therefore, is to provide means whereby the ignition system or mechanism of an automobile or other structure in which ignition systems are included may be readily disconnected from the locking structure or means.

It also is an object of the invention to provide novel means whereby the end of the cable which incloses the conductor leading from the lock structure to an ignition system may be readily attached to and detached from said locking structure.

A further object of the invention is to provide means which, when the locking element of the locking means is moved into position to effect its locking function, is moved into position to prevent disconnection of the ignition system from the said locking means, and which, when the said locking element of the locking means is moved into unlocked position, moves into position to permit such disconnection.

Another object of the invention is to provide means whereby the forward end of the conductor and the cable inclosing the same may be readily attached to and detached from the switch and locking mechanism combined with means whereby detachment is prevented except when the locking element of the locking means is in unlocked position.

Other objects and advantages of the invention will be pointed out in the detailed description thereof which follows or will be apparent from such description.

In order that the invention may be readily understood reference may be had to the accompanying drawing in which I have illustrated one form of a convenient mechanical embodiment of the invention. However, it will be understood that the invention is susceptible of embodiment in other forms of construction than that shown and that changes in the details of construction may be made within the scope of the claims without departing from the said invention In the drawing:

Fig. 1 is a view partly in side elevation and partly in central longitudinal section of a structure embodying the invention;

Fig. 2 is a similar view of the locking and switch mechanism and of a portion of the cable and conductor for connecting said mechanism with an ignition system, with the parts of the locking and switch mechanisms in different positions from that in which they are shown in Fig. 1;

Fig. 3 is a transverse sectional view taken on the line 3—3 of Fig. 1;

Fig. 4 is a transverse sectional view taken on the line 4—4 of Fig. 1; and

Fig 5 is a view partly in side elevation and partly in central longitudinal section of the rear end portion of the locking and switch mechanism and of the front end portion of the cable and conductor.

Referring to the drawing, it will be noted that I have provided a locking structure and switch mechanism comprising a casing or housing 1, preferably of cylindrical shape in cross section, the front end of which is open for the reception of a bearing 2 of collar form within which is mounted a slidable lock cylinder 3 within which is located locking means of any known construction which is adapted to be actuated by means of a key 4. The slidable cylinder 3 is retained within the bearing 2 by means of a screw 5 which extends through the casing 1 and is in engagement with the bearing 2. The inner end of the said screw, which is reduced in size as indicated, extends into a groove or shallow slot 6 in the side of the slidable cylinder 3 and operates both to retain the said cylinder within the bearing 2 and to limit the extent of the sliding or reciprocatory movement thereof. The bearing 2 is retained within the casing 1 by means of a pin 7. The rear end of the casing 1 is turned inwardly as indicated at 10. The turned-in portion is cut away, as indicated at 11 and 12, the portion 12 being of semi-circular shape. The purpose of cutting away these portions will be pointed out hereinafter.

The switch mechanism of the structure is interposed between the portion 10 at the rear end of the casing and the bearing 2 and slidable casing or plunger 3 at the front end thereof. The said switch mechanism comprises an annular member 15 of insulating material at the rear end portion of the cylinder and an annular member 16 at the front end portion thereof immediately in rear of the bearing 2 and slidable cylinder 3. These annular members of insulating material are provided with axial openings 17 and 18 within which the opposite ends of a movable switch member 20 of insulating material is slidably mounted. The intermediate portion of the switch member is enlarged as indicated at 21, the highest or thickest portion thereof being located at about the middle point thereof and the said enlarged portion tapering from that point toward the opposite ends of the said member, the said tapering portions terminating at considerable distances inwardly from the opposite ends of the said member. The forward end of the member 20 is seated against a metal bearing member 22 which in turn is seated against the slidable cylinder or plunger 3 previously referred to. The switch member 20 is provided with a hole 25 which extends longitudinally thereof from the rear end to a point near the front end thereof. Mounted within the said hole is a locking plunger 26 the inner end of which is provided with a head 27 as shown which is seated against the closed end of the hole or opening 25. The locking plunger 26 is of a length substantially greater than that of the switch member 20 so that its rear end projects a considerable distance beyond the rear end of the said switch member. Mounted within the opening 25 and surrounding the plunger 26 is a coiled spring 30 which is normally under compression and in consequence of which has a constant tendency to expand. The front end of the said spring rests upon the rear side of the head 27 while the opposite end thereof is seated against a contact member of metal 31 which is mounted within an opening 32 at the center of a disk 33 of insulating material. The contact member 31 is permanently secured to the disk 33, as is clearly shown. An annular member 35 is located between the disk 33 and the flange portion 10 of the casing 1 previously referred to. The combined thickness of the annular member 35 and the disk 33 is less than the distance between the rear end of the annular member 15 and the inner side of the flange 10, in consequence of which the disk 33 and annular member 35 have a limited play or back and forth movement between the flange 10 and the rear end of the annular member of insulating material 15. The rear side of the annular member 35 is provided with an annular or circular depression 36 for a purpose to which reference will be made hereinafter.

The annular members 15 and 16 previously referred to are spaced from each other as clearly shown in Figs. 1 and 2 of the drawing and are provided respectively with contacts 40 and 41, 42 and 43, as shown. Located intermediate the two pairs of contacts just mentioned is a movable annular contact member 45 which is mounted upon the slidable reciprocable switch member 20 to which reference has been made previously. Located within the contact member 45, which is of rectangular trough-shape in cross section as shown, is a coiled spring 47 which is under tension and which is mounted upon and grips the enlarged intermediate portion 21 of the switch member 20. The connection of the circuit is such that when the contact member 45 is in the position shown in Fig. 1 the conductor 52 is grounded. In the position as shown in that figure the locking means is in locked position. If the locking means be unlocked by means of the key 4 the coiled spring 30 will expand and cause movement of the switch member 20, the locking plunger 26, and the slidable cylinder 3 toward the left into the positions shown in Fig. 2. Movement of the switch member 20 toward the left causes the highest apexial part of the portion 21 of the switch member to travel to the left of the spring 47. As soon as this occurs the said spring, coming in contact with the inclined portion opposite that with which it is in contact in Fig. 1, moves or snaps quickly toward the right and causes the contact member 45 to contact with the contacts 40 and 41 to close the circuit through the ignition system or mechanism in known manner. The contact 40 is in engagement with a binding post 50 from which connection may be made to a source of electrical energy, while the contact 41 has connection with a metal bar or wire 51 which is mounted upon the contact member 31 previously referred to.

The conductor 52 is connected at its front end to a cylindrical contact member 53 the front end of which is open as shown and is adapted to contact with the rear side or end of the contact member 31. The said contact member 53 is mounted within and supported by a bushing 54 of insulating material which is mounted within an elongated sleeve 55 terminating at its forward end in a flange 56 which extends outwardly. The said flange is slit, as indicated at 57, and the portion 57ª between the slits is turned up as clearly shown in the drawing. The conductor is surrounded and protected by means of a flexible armor 58 which in the construction shown consists of coiled wires in duplex or double-ply formation. The forward end of the said armor is permanently secured within the rear end portion of the elongated sleeve 55. The rear end of the said armor is mounted in a similar sleeve 60 and the rear end of the conductor 52 is connected to a contact member 61 of cylindrical formation secured within a bearing sleeve 62 of insulating material which is secured permanently within the sleeve 60. The contact member 61 is screw threaded internally and is adapted to be placed in screw threaded engagement with a screw threaded terminal post 63 which has connection with the ignition mechanism, a timer 64 in the present instance.

When it is desired to assemble the conductor 52 and its protecting armor 58 with the lock and switch mechanisms and with the ignition mechanism, as illustrated, the rear end thereof should be or may be connected to the ignition mechanism by screwing the same onto the screw threaded terminal post 63. The front end thereof may then, or before as may be desired, be inserted through an opening in the dash board 65 of an automobile body, which opening is protected by a bushing 66 preferably of rubber. If the lock is in unlocked position as shown in Fig. 2 the front end of the conductor cable and of the protecting armor may be attached to and connected with the rear end of the lock and switch mechanisms by depressing the disk 33 and the annular member 35 previously referred to so that the flange 56 may be inserted between the said annular member 35 and the flange 10 previously referred to. Depression of the disk 33 and the annular member 35 may be effected by pressing the flange 56 against the edge portion of the annular member 35 at a point opposite the semi-circular opening 12. The flange having been pushed into position takes its seat within the depression 36, whereupon the spring 30, which was slightly compressed upon the insertion of the flange 56 into position, expands and causes the bottom of the recess portion to bear firmly against the front side of the flange 56 and press the same outwardly against the flange 10. At such time the contact member 31 is in contact with the front end of the contact member 53 to which the conductor 52 is connected. There is sufficient spring in the metallic connecting member 51, previously referred to, to permit the inward movement of the disk 33 and the annular member 35. Also there is sufficient space between the disk 33 and the rear end of the annular member 15 to permit such front and rear movements of these parts.

Upon movement of the lock cylinder 3 inwardly from the open position shown in Fig. 2 into position in which locking is effected, shown in Fig. 1, the locking plunger 26 moves to the rear into the position as shown in Fig. 1 beyond the contact 31 and into the cylindrical contact 53. When in such position it is obvious that the flange 56 of the sleeve 55 cannot be disengaged or disconnected from underneath the flange 10.

The projection 57ª previously referred to constitutes a stop which contacts with the corners 70 of the flange 10 to prevent complete rotation of the front end of the conductor 52, armor 58 and the sleeve 55 with respect to the casing 1 and the lock and switch mechanism mounted therein. The said projection also constitutes means to facilitate the removal of flange 56 from the depression or seat 36 in the rear side of the annular member 35. The length of the screw threaded terminal post 63 is such that the rear end portion of the armor and conductor cannot be rotated through a sufficient angle independently of the front end of the said armor and conductor to effect disconnection of the cylindrical contact member 61 from the said post.

The casing 1 within which the locking and switch mechanisms are mounted is provided with a flange 71 by means of which it may be mounted upon the rear side of the instrument board structure 72.

It will be seen that by my invention I have provided means whereby, when the locking means is in locked position with the conductor 52 grounded, the connection between the switch and locking mechanisms and the ignition system or mechanism cannot be interrupted, but upon shifting the locking means into unlocked position, from which follows automatically the shifting of the switch under the influence of the spring 30 previously referred to, the locking plunger 26 is moved into position to permit the front end of the armor and conductor to be detached from the switch and locking mechanisms as previously described. When this has been done repairs to the various parts of the mechanism involved are facilitated.

Having thus described my invention, what I claim and desire to secure by Letters Patent is:

1. In locking means of the character described, the combination of locking means, a switch structure comprising a movable switch element, movement of which is adapted to be effected by movements of the said locking means, a conductor leading from the said switch structure to an ignition system, the front end of said conductor having detachable connection with the said switch structure, and means operating upon movement of the said locking means into locked position to prevent detachment of the said conductor from the said switch structure.

2. In locking means of the character described, the combination of switch mechanism comprising a movable switch element adapted to be moved into position to ground an electric circuit and into position to complete the said circuit through an ignition system, a conductor leading from the said switch mechanism to the said system, means whereby one end of the said conductor is adapted to be attached to and detached from the said switch mechanism, and means actuated into position to prevent detachment of the said conductor from the said switch mechanism when the said movable switch element is moved in a direction to effect grounding of the said circuit.

3. In locking means of the character described, the combination of a casing, locking and switch mechanism mounted within said casing, the said switch mechanism including a movable switch element which is adapted to be moved automatically upon locking movement of the said locking mechanism into position to effect grounding of a circuit through an ignition system and in the opposite direction upon movement of the said locking mechanism in the opposite direction into unlocking position, a conductor leading from the said switch mechanism to the said ignition system, an armor surrounding said conductor, said armor terminating at its front end in an outwardly extending flange, which flange is adapted to be engaged with and disengaged from the said casing, and a locking plunger mounted upon the said movable switch element which is adapted to be moved upon the operation of the said element into and out of engagement with a portion of the said conductor to prevent and permit disconnection and connection of the said conductor and the said armor from and with the said casing.

4. In locking means of the character described, the combination of locking and switch mechanisms, a housing for the said mechanisms, the rear end of which is partially closed leaving an opening extending into the said housing, the said switch mechanism including a movable element having a hole therein which extends longitudinally thereof, one end of which is closed which end is seated against the locking mechanism, the said switch mechanism including a contact member located at its rear end, a conductor leading from the said switch mechanism to an ignition system, said conductor comprising a contact member adapted to contact with the contact member of the switch mechanism, and the two members having openings therein which are in alinement with each other, a protecting armor for the said conductor, said armor terminating in an outwardly extending flange at its front end, and the front end of the said armor adapted to engage the opening in the rear end of the said housing with the terminal flange of the said protecting armor located underneath the flange of the said housing, a locking plunger mounted within the hole in the said movable element of the switch mechanism, and means mounted within the said hole and in engagement with the said locking plunger for effecting movement of the said movable element and of the said plunger upon locking and unlocking movements of the said locking mechanism, the said locking plunger being caused by said movements to be engaged with and disengaged from the contact member upon the said conductor.

5. In locking means of the character described, the combination of a switch mechanism, an ignition mechanism, a conductor having a protecting armor extending between the said switch mechanism and the said ignition mechanism, one end of the said conductor having detachable connection with the said ignition mechanism, and the opposite end thereof having detachable connection with the said switch mechanism, and means operative upon operation of the said switch mechanism to permit or prevent detachment of the said conductor from the said switch mechanism.

6. In locking means of the character described, the combination of a housing the rear end of which is partially closed leaving an opening which leads into the said housing, a disk extending transversely of the said housing near the rear end thereof, an annular member located intermediate the said disk and the closed portion of the said rear end, the said disk and the said annular member having limited movement axially of the said housing and of the said switch mechanism a contact member mounted upon the said disk in alinement with the opening in the rear end of the said housing, a conductor terminating in a contact member at its front end having an opening adapted to be placed in alinement with an opening in the switch contact member, means whereby the front end of the said conductor is adapted to be attached to and detached from a position within the opening in the rear end of said housing, and a locking plunger carried by a portion of the said switch mechanism and adapted to be moved into and out of position to prevent or permit attachment and detachment of the said conductor from the said housing upon the operation of the said switch mechanism.

7. In locking means of the character described, the combination of a switch mechanism, a housing therefor the rear end of which is partially closed leaving an opening which leads into the said housing, a conductor having a protective armor leading from the said switch mechanism to an ignition system, the said protective housing terminating at its front end in a flange which is adapted to engage underneath the closed portion of the rear end of the said housing when the front end of said protective armor is placed in the opening in the rear end of said housing, and means acting automatically to lockingly engage the front ends of the said conductor and the said protective armor with the said housing upon the operation of the said switch to ground a circuit including said ignition system.

8. In a device of the character described, the combination of a switch mechanism, a conductor for connecting said switch mechanism to an ignition system, said conductor having detachable connection with said switch mechanism, and means acting to lock the said conductor against detachment from said switch mechanism when the latter is operated into off position.

In testimony that I claim the foregoing as my invention I have hereunto signed my name this 2nd day of July, A. D., 1926.

WILSON HEMINGWAY, Jr.